W. L. BLISS.
SYSTEM OF ELECTRICAL DISTRIBUTION.
APPLICATION FILED JULY 2, 1904. RENEWED SEPT. 8, 1914.

1,272,328.

Patented July 9, 1918.

WITNESSES:
Herbert J. Smith

INVENTOR.
William L. Bliss
BY
ATTORNEYS.

UNITED STATES PATENT OFFICE.

WILLIAM L. BLISS, OF NEW YORK, N. Y., ASSIGNOR, BY MESNE ASSIGNMENTS, TO U. S. LIGHT & HEAT CORPORATION, OF NIAGARA FALLS, NEW YORK, A CORPORATION OF NEW YORK.

SYSTEM OF ELECTRICAL DISTRIBUTION.

1,272,328.                 Specification of Letters Patent.        Patented July 9, 1918.

Application filed July 2, 1904, Serial No. 215,085. Renewed September 8, 1914. Serial No. 860,790.

*To all whom it may concern:*

Be it known that I, WILLIAM L. BLISS, a citizen of the United States, residing at New York, in the county of Kings and State of New York, have invented new and useful Improvements in Systems of Electrical Distribution, of which the following is a full, clear, concise, and exact description, reference being had to the accompanying drawing, forming a part of this specification.

My invention relates to improvements in systems of electrical distribution. It is especially adapted for lighting cars or trains, but may be applied to other purposes.

In the form of car lighting system in which my invention may be embodied the principal source of electrical energy is a generator which is driven by a car axle. The generator furnishes current to charge a storage battery and operate lamps when the train is running above a certain speed. When the train is at rest, or is running at a low speed, the lamps are operated by current from the storage battery. My invention comprehends certain improvements in means for regulating the generator and maintaining constant voltage upon the lamps. It has for its object to render the regulating means quiescent under certain conditions.

The regulating means that I preferably employ in my system are counter electromotive force devices, one for regulating the field strength of the generator and the other for regulating the voltage impressed upon the lamps. Each counter electromotive force device consists of a field winding and an armature. In practice I preferably so combine the two counter electromotive force devices that I simply use one field winding for the two devices, and this winding I shall hereinafter call the controlling winding. The armature of one counter electromotive force device is connected in the shunt field circuit of the generator, and the armature of the other is connected in the lamp circuit.

The counter electromotive force device for regulating the generator field is known in practice as the "field bucker," and the one for regulating the voltage impressed upon the lamps as the "lamp bucker." I shall use these terms in describing the preferred form of my invention.

The armatures of the buckers are mechanically connected to the armature of a motor. When the generator commences to operate, the motor starts the buckers. As soon as the buckers become operative, the same act as motors. The motor is then relieved of its load, and is driven by the buckers. In consequence it acts as a generator. Under these conditions, the motor serves to regulate the speed of the buckers, keeping them at practically constant speed.

The principal circuits which exist in the system are the generator or main circuit, the battery circuit, and the lamp circuit, the battery circuit and the lamp circuit being parallel branches of the main circuit. In carrying out my invention in its preferred form I arrange the controlling winding of the bucker in the battery circuit as has heretofore been the practice. When the generator is in operation, the controlling winding is subjected to the current which is sent through the battery circuit to charge the storage battery. Inasmuch as this current varies according to the variations in potential impressed by the generator at the battery terminals, the controlling winding causes the buckers to vary the counter electromotive forces produced thereby. The field bucker varies the field strength of the generator inversely as the speed of the armature of the generator varies. Consequently the voltage developed by the generator is confined within predetermined limits, notwithstanding the excessive variations in speed.

In order to charge the battery it is necessary to allow the generator voltage to rise above the proper limit for the lamps. It is therefore necessary to take up a variable drop in voltage in the lamp circuit. The current which the generator sends through the battery circuit is substantially proportional to the rise in voltage at the battery terminals above the normal battery voltage. Therefore, the controlling winding causes the lamp bucker to produce a counter electromotive force in the lamp circuit which is equal to the excess voltage necessary to charge the battery, the result being that practically constant voltage is maintained upon the lamps.

In order to effect proper regulation, it is necessary that the charge in the battery be kept in such a state that the counter electromotive force of the battery remains substantially constant at all times. It is a fact that throughout the greater portion of the period that current is sent through a storage battery to bring it from a state of being discharged to a state of being fully charged the counter electromotive force of the storage battery remains quite constant. To more clearly represent this fact, let it be assumed that a charging current is sent through a discharged battery. The counter electromotive force of the battery is at first low, but rises rapidly. This first epoch lasts but a few moments, during which the counter electromotive force reaches a predetermined limit. Then a second epoch ensues, continuing for a prolonged period, lasting many times as many minutes as the first, during which the counter electromotive force of the battery remains substantially constant and constant current flows through the battery circuit. When the battery becomes nearly fully charged a third epoch takes place, in which the counter electromotive force of the battery rises very abruptly above that existing in the preceding epoch.

It will thus be seen that the process of charging the battery may be divided into three epochs: the first when the storage battery is in a depleted condition and its counter electromotive force is low; the second when the counter electromotive force of the battery remains quite constant and constant current flows through the battery; and the third when the battery approaches the condition of being fully charged and its counter electromotive force rises rapidly above that which prevailed in the second epoch. Of course, it is assumed that constant voltage is impressed upon the terminals of the battery by the generator throughout the three epochs.

The first epoch lasts only a few minutes, the third epoch is very seldom reached, but the second epoch continues for a very long period say 10, 20, or 30 hours.

My system is designed to operate so that the battery will be kept in such a state that the conditions obtaining in the second epoch will always prevail. Therefore, the current which is sent through the battery circuit and which energizes the controlling winding will remain substantially constant, assuming the conditions that constant voltage is impressed upon the battery terminals. Accordingly, the controlling winding will so control the operation of the buckers at all times that the generator voltage will be confined within proper limits and the voltage upon the lamps will be kept practically constant.

The polarity of the current in the battery circuit is subject to reversal for the reason that the current which the battery discharges flows through the battery circuit in an opposite direction to that which the generator delivers to the storage battery.

Let it be assumed that the generator voltage is slightly less than that of the storage battery. The storage battery will then discharge current to operate the lamps. This current would energize the controlling winding and cause the buckers to become direct electromotive force devices or boosters, and consequently augment the voltage in the field circuit, and also in the lamp circuit, thereby producing deleterious effects in the regulation.

One important feature in the preferred form of my invention is certain circuit relations whereby the drop in potential across the terminals of the controlling winding will be eliminated, or practically so, when the battery discharges and said winding rendered inert in consequence.

In order to more particularly explain the nature of my invention, I shall describe the car lighting system which is illustrated in the accompanying drawing in which.

Figure 1:
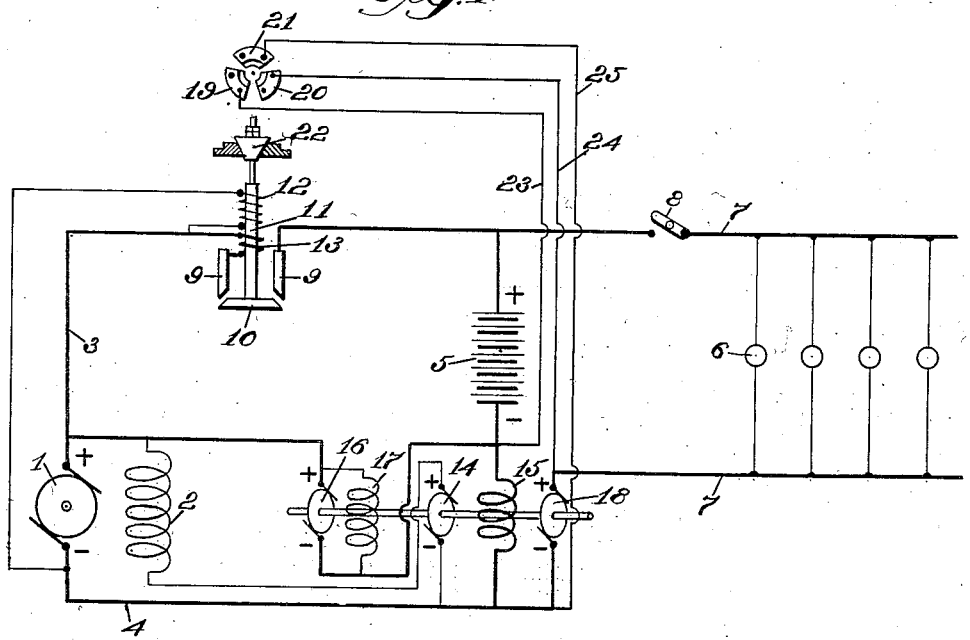
Figure 1 illustrates diagrammatically one form which my invention may assume.

In the drawing I have represented only sufficient features of the system to exemplify my invention. It will, of course, be understood that the features of my invention are susceptible of various applications and that the same may be used in connection with other forms of apparatus than that which I shall explain in detail. Moreover, I am aware that various circuit relations may be devised to produce the results that I seek. Viewed from one standpoint my invention contemplates any provision whereby the controlling winding is rendered ineffective when the battery discharges.

The generator is provided with an armature 1 and a shunt field 2. The armature is driven by a car axle or other means. From the generator extends a main or generator circuit 3—4, through which current is supplied to a storage battery 5 and lamp or other translating devices 6. The storage battery is connected in one parallel circuit known as the battery circuit, and the lamps are connected in another parallel circuit 7—7, known as the lamp circuit. The lamp circuit may be controlled by a hand switch 8.

The main circuit is controlled by an automatic switch which consists of stationary contacts 9—9 and a movable contact 10, adapted to bridge the stationary contacts. The movable contact is carried by a plunger 11 which is operated by a shunt winding 12 and a series winding 13. The shunt winding 12 is connected across the terminals of the armature. The series winding 13 is connected in the main circuit in series with the switch contacts. When the generator develops a predetermined voltage, the shunt winding closes the switch. The series winding then becomes energized and assists the shunt winding in holding the movable contact firmly in engagement with the stationary contacts. When the generator voltage falls below that of the storage battery, the battery sends current backward through the series winding, thereby causing the series winding to oppose the shunt winding and open the switch.

The field bucker is provided with an armature 14 which is connected in the shunt field circuit of the generator. The controlling winding 15 which is in fact the field winding of both the field bucker and the lamp bucker controls the action of the field bucker and also the lamp bucker in producing regulation. The armature 14 is connected to a motor having an armature 16 and a shunt field 17. The motor is connected in a circuit extending between one generator terminal and a point in the battery circuit, between the battery and the controlling winding, thereby causing certain results that will be hereinafter explained.

When the generator sends the current through the storage battery, the field bucker produces a counter electro-motive force in opposition to the current the generator tends to send through the field winding. Upon variations in the generator voltage, the current flowing through the battery circuit varies, thereby causing a variation in the counter electromotive force produced by the field bucker. In consequence the field strength of the generator is varied approximately inversely to the speed thereof. The generator voltage is therefore confined within safe limits.

Figures 2, 3:
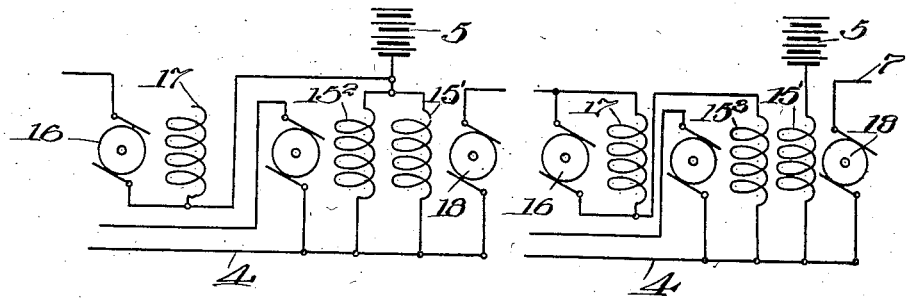
Figs. 2 and 3 illustrate certain modified arrangements.

The lamp bucker is provided with an armature 18 which is arranged in the lamp circuit and connected to the same motor as the armature 14. Its operation is controlled by the controlling winding 15. In practice the lamp bucker, the field bucker, and the motor are preferably combined into a unitary structure, but, of course, each of these devices may be constructed as an independent entity. Moreover, instead of having a single controlling winding for the two buckers as illustrated in Fig. 1 each bucker may have its own controlling winding as illustrated in Fig. 2 in which two windings 15′, 15² are connected in parallel in the battery circuit.

As has been previously stated, the battery is kept in such a condition that its counter electromotive force remains substantially constant. Inasmuch as the current which is sent through the battery circuit is substantially proportional to the rise in voltage at the battery terminals above the normal voltage of the battery, the controlling winding 15 causes the lamp bucker to produce a counter electromotive force in the lamp circuit equal to the increase in voltage above the proper lamp voltage. Accordingly, practically constant voltage is maintained upon the lamps. In the embodiment of the invention, in which the single field coil 15 serves to supply the flux for both armature 18 and armature 14, the cross flux due to armature 18 will react on the field due to the winding 15, which reaction will necessarily affect the regulation of the generator 1. For instance, the turning on of lamps 6 while the generator 1 is operating, resulting in a current flow through the armature 18, may distort the field due to the winding 15, thus decreasing the bucking effect of armature 14. Any tendency to a lowering of voltage on the generator leads due to turning on of the lamps will be instantly compensated for, bringing back conditions of equilibrium.

In order to render the buckers inoperative when the generator is running at a low speed or is at rest, a short circuiting switch is associated with the automatic switch. The short circuiting switch contains three stationary contact segments and a movable plug adapted to be inserted between the same. The plug is preferably mounted upon the plunger 11 of the automatic switch. When the automatic switch is closed, the plug is raised and consequently the short circuiting switch is open. The segment 19 is connected through conductor 23 with one side of the controlling winding, while the segment 20 is connected through conductor 24 with one side of the armature 18. The segment 21 is connected through conductor 25 with the other side of said armature 18 and said controlling winding 15. When the short circuiting switch is closed the lamp bucker is completely short circuited, thereby rendering it inoperative. Also the field winding of both buckers is short-circuited, so that the battery discharging current will not affect either the lamp or generator regulating means.

To explain the operation of my car lighting system, I shall assume certain conditions that may prevail in practice. It may be assumed that the storage battery consists of 32 cells having a normal voltage of about 64 volts, that the lamps are about 65 volt lamps, and that the generator runs at 500 revolutions per minute and develops 64 volts when the train is running at about 20 miles per hour. When the train is running less than 20 miles per hour, or is at rest, the automatic switch is open and the storage battery furnishes the current to operate the lamps. Current then flows from the positive terminal of the storage battery through switch 8, conductor 7, lamps 6, conductor 7, conductor 24, contacts 20, 22 and 19, and conductor 23 back to the negative terminal of the battery. When the train reaches a speed of approximately 20 miles an hour, the automatic switch closes. The generator voltage and the battery voltage are then about equal, and therefore it may be considered that the storage battery and generator each furnish a part of the current for operating the lamps.

As the speed of the train increases above 20 miles per hour, the generator voltage rises above that of the storage battery and consequently the generator sends current through the battery circuit to charge the storage battery, as well as through the lamp circuit to operate the lamps. The current from the generator flows from positive terminal through conductor 3, switch contacts 9, 10, 9 to the juncture of the battery circuit and the lamp circuit. At this point it divides, one part flowing through the battery 5 and the controlling winding 15, and the other through the switch 8, conductor 7, lamps 6, conductor 7, and armature 18. The current which thus flows through the battery circuit and lamp circuit then reunites in conductor 4 and returns to the negative terminal of the generator. When the train speed increases to 60 miles an hour, the generator runs at 1500 revolutions per minute. If all other conditions remained the same, it would then develop about 192 volts. Its field strength is weakened, however, as the speed increases and consequently the voltage remains within safe limits. Inasmuch as about 25 per cent. increase in the generator voltage above the normal battery voltage is sufficient to send the full charging current through the battery, the generator is allowed to develop about 80 volts at the maximum speed of the train.

The field circuit of the generator is energized by current flowing from the positive terminal through the field coil 2, field bucker armature 14, and conductor 4 back to the negative terminal.

When the generator commences to operate it sends current from the positive terminal through the armature 16 and field 17 of the motor. Accordingly the motor commences to operate and rotates the armatures of the field and lamp buckers. The field and lamp buckers are thus started. When the system reaches a certain stage of operation, the buckers absorb electrical energy from the system and become self-operating. The motor is then relieved of its load and is driven by the buckers. In consequence, it becomes a direct electromotive force device and restores to the system a portion of the energy which is consumed by the buckers. When the buckers are in operation, the motor really serves as a regulating device therefor, and keeps the armature of the buckers rotating at practically constant speed in the fields that are excited by the controlling winding 15.

Inasmuch as the controlling winding 15 is in the battery circuit it is merely subjected to the current that the generator sends through the storage battery. In consequence, the field bucker regulates the generator to produce constant battery current at constant speed of the generator. If the controlling winding 15 were arranged in the main circuit, the total current delivered by the generator would be kept practically constant, and consequently upon changes in the lamp load the charging current for the battery would be varied. For instance, if the total current delivered by the generator were 35 amperes, the battery receiving 15 amperes, and the lamps 20 amperes, and the lamp current load were increased until the lamps consume 30 amperes, the battery would be robbed of current and would only receive 5 amperes. When the controlling winding is in the battery circuit, as illustrated in the drawing, the total current may vary according to the lamp load, and consequently the battery charging current remains substantially constant at constant speed of the generator. For example, if the generator be delivering 35 amperes, the battery receiving 15 amperes and the lamps consuming 20, and the lamp load be increased until the lamps consume 35 amperes, the total current would increase to 50 amperes, so that 15 amperes would remain for the battery. The advantage that arises from regulating the generator to maintain constant current for charging the battery at constant speed of the generator is the fact that when the train runs upon a definite schedule it is possible to so adjust the regulation that the battery will receive sufficient current from the generator during each trip of the train to restore all the current that is consumed therefrom by the lamps.

The fact has been previously brought out that when the automatic switch is open and the short circuiting switch is closed, the buckers are completely short circuited and thus rendered inoperative. In order for the automatic switch to open the battery must discharge several amperes back through the series winding 13. It may be assumed that the generator voltage must fall to nearly 50 volts, about 10 volts below the battery voltage, before the automatic switch will open and the short circuiting switch will render the buckers inoperative.

My invention concerns itself more particularly with a provision whereby when the battery discharges and the automatic switch is closed, the buckers will be inoperative. It is not limited in its application, however, to systems wherein an automatic switch is employed, but it is susceptible of useful application in various relations. In carrying out my invention in the preferred way I provide certain circuit relations between the generator, the storage battery and the controlling winding, whereby when the battery discharges and the generator is operating current delivered by the generator opposes the current which the battery tends to send to the controlling winding. The result is that the difference in potential across the controlling winding is practically eliminated, or, at least, it is decreased to such a degree that the buckers are substantially inoperative.

In the system illustrated in Figs. 1 and 2, the motor circuit extends between one terminal of the generator and a point in the battery circuit between the battery and the controlling winding 15 or the windings 15′, 15². In consequence the motor current flows through the controlling coil when the battery is being charged. When the battery discharges the current that it tends to send through the controlling winding 15 is opposed by the motor current. The difference in potential across the terminals of the controlling winding is thus practically eliminated, and consequently said winding is inert, thereby rendering the buckers inoperative. It will be observed that the current discharged by the battery tends to flow through the controlling winding in an opposite direction to the motor current. Of course these currents cannot flow through the controlling windings in opposite directions simultaneously, and therefore the result is that only the excess of one current over the other flows through said controlling winding. The apparatus may be so designed that the excess of the current discharged by the battery over the motor current may be reduced to such an extent that it will be practically negligible. Accordingly, the tendency of the buckers to act as boosters will be practically eliminated.

When the condition prevails that the motor current opposes the flow of current from the battery through the controlling winding, the current discharged by the battery to operate the lamps flows from the positive terminal of the battery through the hand switch 8, conductor 7, lamps 6, conductor 7, armature 18, conductor 4, generator armature 1, motor 16—17, back to the negative terminal. The current delivered by the generator at the same time will flow from the positive terminal through the motor armature 16 and field 17, thence through the storage battery, switch 8, conductor 7, lamps 6, conductor 7, armature 18, and conductor 4 back to the negative terminal. It will thus be seen that the current delivered by the generator and that discharged by the battery will flow through the same circuits, one being superimposed upon the other.

The tendency of the buckers to boost is proportional to the lamp load, and likewise the greater the tendency for the buckers to boost the greater the load upon the motor. Consequently, when the battery tends to send more current through the controlling winding 15 the motor current increases, thereby preserving a substantial equilibrium between the opposing currents tending to flow through the controlling winding.

Of course it will be understood that in some instances instead of causing the motor current to prevent the flow of current from the battery through the controlling winding 15 I may send the motor current through a winding acting in opposition to the controlling winding 15, and thus cause the motor current to inductively render the controlling winding quiescent when the battery discharges. Such an arrangement is illustrated in Fig. 3, in which a winding 15³ in series with the motor armature is wound to oppose the effect of winding 15.

While it is preferable to so design the apparatus that the buckers will be totally inoperative when the battery discharges, it will, of course, be understood that the objects of my invention may be attained if the boosting effect be reduced to such an extent as not to produce any deleterious effects in the operation of the system.

The embodiment of the invention herein described is for the purpose of illustration only. The principles of the invention may be applied to many other types of regulator in which it is desired to prevent battery discharging current from affecting the regulation. Such modifications fall within the scope of the invention which is defined in the appended claims.

Having thus described my invention, what I claim as new and desire to secure by Letters Patent is:—

1. In a lighting system, in combination, a generator driven at a variable speed, a storage battery and translating devices arranged in circuit with said generator, provided also with means for regulating said generator to confine the output thereof within pre-arranged limits, said means being provided with an electromagnetic winding for controlling the action thereof, arranged in circuit in series with said storage battery, and said regulating means including means for causing current from said generator to prevent said winding from being rendered effective by current from said storage battery.

2. In a lighting system, in combination, a generator driven at a variable speed, a storage battery and translating devices arranged in circuit with said generator, provided also with means for regulating said generator to confine the output thereof within prearranged limits, said means being provided with an electromagnetic winding for controlling the action thereof, arranged in circuit in series with said storage battery, and said regulating means including connections for causing current from said generator to oppose the flow of current through said winding from said battery to prevent said winding from being energized when said battery discharges.

3. In a lighting system, in combination, a generator, a storage battery and translating devices arranged in circuit with said generator, means for modifying the electrical conditions in said system, said means being provided with an electromagnetic winding for controlling the action thereof, arranged in circuit in series with said storage battery, and said means for modifying the electrical conditions including means for causing current from said generator to prevent said winding from being rendered effective by current from said storage battery when said storage battery discharges.

4. In a lighting system, in combination, a generator, a storage battery and translating devices arranged in circuit with said generator, a dynamo electric machine for modifying the electrical conditions in said system, said machine being provided with an electromagnetic winding for controlling the action thereof, arranged in circuit in series with said storage battery, and said winding being connected to cause current from said generator to prevent said winding from being rendered effective by current from said storage battery.

5. In a lighting system, in combination, a generator running at variable speed, a storage battery and translating devices arranged in circuit with said generator, a dynamo electric machine for modifying the electric conditions in said system, said machine being provided with an electro-magnetic winding for controlling the action thereof, and said winding being arranged in circuit in series with said storage battery, an electric motor co-acting with said dynamo electric machine and circuit connections for causing the motor current to prevent said winding from being rendered effective by the current from said storage battery.

6. In a lighting system, in combination, a generator, a storage battery and translating devices arranged in circuit with said generator, a dynamo electric machine for modifying the electrical conditions in said system, said machine being provided with an electromagnetic winding for controlling the action thereof and said winding being arranged in circuit in series with said storage battery, an electric motor coacting with said dynamo electric machine, and connected in circuit with said generator, said motor being arranged in circuit in series with said winding so as to make the motor current oppose the flow of current through said winding from said battery.

7. In a lighting system, in combination, a generator, a main circuit extending from said generator, a storage battery arranged in one parallel branch of said main circuit, translating devices arranged in another parallel branch of said main circuit, a dynamo electric machine operatively arranged in circuit to modify the electrical conditions in said system, said machine being provided with an electromagnetic winding for controlling the operation thereof and said winding being arranged in the battery branch circuit, an electric motor coacting with said machine, and connected in circuit with said generator, said motor being connected in circuit in series with the armature of said generator and said field winding so as to make the motor current oppose the flow of current through said winding from said storage battery.

8. In a lighting system, in combination, a generator driven at a variable speed, a storage battery and translating devices arranged in circuit with said generator, a dynamo electric machine operatively arranged in circuit with said generator to confine the output thereof within pre-arranged limits, the field winding of said machine being arranged in circuit in series with said storage battery, and said circuit being arranged to cause current from said generator to prevent said winding being rendered effective by current from said storage battery.

9. In a lighting system, in combination, a generator driven at a variable speed, a storage battery and translating devices arranged in circuit with said generator, a dynamo electric machine operatively arranged in circuit with said generator to regulate the same and thereby confine the output thereof within pre-arranged limits, the field winding of the dynamo electric machine being arranged in circuit in series with said storage battery, a motor coacting with said dynamo electric machine, said motor being arranged in circuit in series with the armature of said generator and said field winding so as to make the motor current oppose the flow of current through said winding from said battery when said battery discharges.

10. In a lighting system, in combination, a generator driven at a variable speed and having a shunt field winding, a main circuit extending from said generator, a storage battery arranged in one parallel branch of said main circuit, translating devices arranged in another parallel branch of said main circuit, a dynamo electric machine having the armature thereof arranged in circuit with said shunt field winding to regulate said generator, the field winding of said dynamo electric machine being arranged in the battery branch circuit, and a motor coacting with said dynamo electric machine, said motor being arranged in circuit in series with the armature of said generator and the field winding of said dynamo electric machine.

11. In a lighting system, in combination, a generator, a storage battery and translating devices arranged in circuit with said generator, means for regulating the voltage impressed upon said translating devices, said means being provided with an electromagnetic winding for controlling the action thereof, said winding being arranged in circuit in series with said storage battery, and said means being also arranged for causing current from said generator to prevent said winding from being rendered effective by current from said storage battery.

12. In a lighting system, in combination, a generator, a storage battery and translating devices arranged in circuit with said generator, a dynamo electric machine for regulating the voltage impressed upon said translating devices, the field winding of said dynamo electric machine being arranged in circuit in series with said storage battery and circuit connections being arranged for causing current from said generator to prevent said winding from being rendered effective by current from said storage battery.

13. In a lighting system, in combination, a generator, a storage battery and translating devices arranged in circuit with said generator, a dynamo electric machine having the armature thereof arranged in circuit to introduce counter-electro-motive-force into the circuit of said translating devices so as to regulate the voltage impressed upon said translating devices, the field winding of said dynamo electric machine being arranged in circuit in series with said storage battery and circuit connections for causing current from said generator to oppose the flow of current through said winding from said storage battery so as to prevent said winding from being energized by current from said storage battery.

14. In a lighting system, in combination, a generator, a storage battery and translating devices arranged in circuit with said generator, a dynamo electric machine for regulating the voltage impressed upon said translating devices, the field winding of said dynamo electric machine being arranged in circuit in series with said storage battery, a motor coacting with said dynamo electric machine, and connected in circuit with said generator, said motor being connected in circuit in series with the armature of said generator and said field winding so as to make the motor current prevent the field winding of said dynamo electric machine from being rendered effective by current from said storage battery.

15. In a lighting system, in combination, a generator, a main circuit extending therefrom, a storage battery arranged in one parallel branch of said main circuit, translating devices arranged in another parallel branch of said main circuit, a dynamo electric machine having the armature thereof arranged in the translating branch of said main circuit to introduce counter-electromotive-force in said branch circuit to regulate the voltage impressed upon said translating devices, the field winding of said machine being connected in the battery branch circuit, a motor coacting with said dynamo electric machine, said motor being arranged in circuit in series with the armature of said generator and said field winding so as to make the motor current oppose the flow of current through said winding from said storage battery to render said winding inert during certain conditions in the operation of said system.

16. In a lighting system, in combination, a generator driven at a variable speed, a storage battery and translating devices arranged in circuit with said generator, a dynamo electric machine having a pair of armature windings, one of said windings being operatively connected in circuit to regulate the field strength of said generator inversely as the speed of the armature of said generator varies, and the other armature winding of said dynamo electric machine being arranged in circuit to regulate the voltage impressed upon said translating devices, the field winding of said dynamo electric machine being arranged in circuit in series with said storage battery, a motor coacting with the armature of said dynamo electric machine, said motor being connected in circuit in series with the armature of said generator and the field winding of said dynamo electric machine so as to make the motor current oppose the flow of current through said field winding from said storage battery to render said field winding inert whenever said storage battery discharges.

17. In a lighting system, in combination, a generator driven at a variable speed, a main circuit extending therefrom, a storage battery arranged in one parallel branch of said main circuit, translating devices arranged in another parallel branch of said main circuit, a dynamo electric machine having a field winding and a pair of armature windings, one of said armature windings being arranged to regulate the field strength of said generator to confine the output of said generator within pre-arranged limits and the other being arranged in the translating branch of said main circuit to introduce counter-electro-motive-force into the circuits of said translating devices to regulate the voltage impressed thereon, the field winding of said dynamo electric machine being arranged in the battery branch circuit, a motor coacting with the armature of said dynamo electric machine, said motor being connected in circuit in series with said armature of said generator and the field winding of said dynamo electric machine so as to make the motor current oppose the flow of current through the field winding of said dynamo machine from said storage battery to render said winding inert during certain stages of the operation of said system.

18. In a lighting system, in combination, a generator driven at a variable speed and having a shunt field winding, a main circuit extending from said generator, automatic means for controlling said main circuit, a storage battery arranged in one parallel branch of said main circuit, translating devices arranged in another parallel branch of said main circuit, a dynamo electric machine having a pair of armatures, one of said armatures being connected in the field circuit of said generator to regulate the strength of said shunt field inversely as the speed of the armature of said generator varies, and the other armature being connected in the translating branch of said main circuit to introduce counter-electro-motive-force into the circuit of the translating devices to regulate the voltage impressed thereon, the field winding of said dynamo electric machine being arranged in the battery branch circuit, a motor coacting with said armatures, said motor being connected in circuit to take its power from said generator, the same being connected in circuit in series with the armature of said generator and the field winding of said dynamo electric machine so as to make the motor current oppose the flow of current through the field winding of said dynamo electric machine from said storage battery to render the field winding of said dynamo electric machine inert during certain stages in the operation of said system.

19. In combination, a generator, a storage battery adapted to be charged thereby, translating devices, a counter electro-motive force device for regulating said generator and having a controlling magnet connected in the battery circuit in series with the battery, and a motor coacting with said device and connected in series with said magnet whereby current discharged from said battery when the generator is operative is prevented from flowing through said magnet by an opposing current flowing through said motor from said generator.

20. In combination, a generator, a storage battery adapted to be charged thereby, translating devices, a counter electro-motive force device regulating said generator and maintaining constant voltage upon said translating devices, and a motor coacting with said device, said device being provided with a field or controlling magnet connected in the battery circuit in series with the battery and also in series with said motor whereby current from said battery is prevented from flowing through said magnet when the generator is operative by an opposing current flowing through said motor from said generator.

21. In a system of electrical distribution in combination, a translating circuit, two sources of electric energy, means connecting said circuit with said sources, whereby said sources are adapted to jointly supply current to said translating circuit under certain conditions and to individually supply current thereto under other conditions, an electro responsive regulator for modifying the electrical conditions in the system, said regulator having electrical connections with both of said sources and including means whereby current from one source controls said regulator under predetermined conditions, and also including means for opposing the current from one source by current from the other source under other predetermined conditions to render said regulator ineffective.

22. In a system of electrical distribution in combination, a translating circuit, two sources of electric energy, means connecting said circuit with said sources, whereby said sources are arranged to jointly supply current to said translating circuit under certain conditions and to individually supply current thereto under other conditions, an electro responsive regulator for modifying the electrical conditions in the system, said regulator having electrical connections with both of said sources and having means for controlling the operation of said regulator by current from one source, while the other source is quiescent and also having means for opposing the current from one source by current from the other source under certain conditions to practically eliminate the drop in potential across said regulator, thereby rendering the same inoperative.

23. In a system of electrical distribution, in combination, a generator, a main circuit extending therefrom and divided into two parallel branches, one the battery branch including a storage battery, and the other, the lamp branch including translating devices, an electromagnetic winding arranged in said battery branch, and circuits established between said winding and said generator whereby the drop in potential across the terminals of said winding is practically eliminated when said storage battery discharges.

24. In a car lighting system, in combination, a main generator, a storage battery supplied thereby, a bucker having a field winding connected in the battery circuit in series with said battery, and a motor connected to said bucker, said motor having one terminal connected between said battery and said bucker field winding.

25. In an electrical system of distribution, a variable speed generator, a storage battery to be charged thereby, lamps to be supplied by said generator or said battery, regulating means for said system, said regulating means including a controlling coil in series with the battery, and a coil traversed by current to said lamps, a switch, a coil connected across the generator and a coil in series with the generator, said coils coöperating to control said switch, and switch contacts adapted to render said first coils effective when said switch coils act accumulatively and adapted to short-circuit said first coils when said switch coils are energized differentially.

26. In car-lighting apparatus, in combination, an electric generator, a storage battery adapted to be charged thereby, lamps connected across said battery, regulating apparatus for said generator comprising a coil connected to be traversed by current flowing to said lamps and adapted to exert a magnetic effect upon the remainder of said regulating apparatus, and means adapted automatically to complete a shunt about said coil upon the voltage of said generator falling below that of said battery.

27. In car-lighting apparatus, in combination, an electric generator, a storage battery adapted to be charged thereby, lamps connected across said battery, regulating apparatus for said generator comprising a coil connected to be traversed by current flowing to said lamps and adapted to exert a magnetic effect upon the remainder of said regulating apparatus, means adapted to disconnect said generator from said battery upon the voltage of the generator falling below that of said battery, and means coacting with said disconnecting means and controlled thereby and adapted to render said coil ineffective upon said generator being disconnected.

In witness whereof I have hereunto subscribed my name in the presence of two witnesses.

WILLIAM L. BLISS.

Witnesses:
JOHN L. BLISS,
J. A. ROBERTSON.